United States Patent
Allais et al.

(10) Patent No.: US 10,464,854 B2
(45) Date of Patent: Nov. 5, 2019

(54) PROCESS FOR PREPARING A FERTILISER

(71) Applicant: SHELL OIL COMPANY, Houston, TX (US)

(72) Inventors: Cyrille Paul Allais, Amsterdam (NL); Rafael Alberto Garcia Martinez, Calgary (CA); Klaas Jan Hutter, Pocatello, ID (US); Charles James Ingoldsby, Calgary (CA); Jason Trevor O'Brien, Pinkenba (AU); Carlos Moreira Tomaz, Rio de Janeiro (BR)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 14/901,748

(22) PCT Filed: Jul. 2, 2014

(86) PCT No.: PCT/EP2014/064124
§ 371 (c)(1),
(2) Date: Dec. 29, 2015

(87) PCT Pub. No.: WO2015/000996
PCT Pub. Date: Jan. 8, 2015

(65) Prior Publication Data
US 2016/0368830 A1    Dec. 22, 2016

Related U.S. Application Data

(60) Provisional application No. 61/842,536, filed on Jul. 3, 2013.

(51) Int. Cl.
*C05B 17/00* (2006.01)
*C05B 1/04* (2006.01)
*C05B 7/00* (2006.01)
*C05B 13/06* (2006.01)
*C05D 9/02* (2006.01)
*C05B 19/00* (2006.01)

(52) U.S. Cl.
CPC ............... *C05B 17/00* (2013.01); *C05B 1/04* (2013.01); *C05B 7/00* (2013.01); *C05B 13/06* (2013.01); *C05B 19/00* (2013.01); *C05D 9/02* (2013.01)

(58) Field of Classification Search
CPC .......... C05B 7/00; C05B 13/06; C05B 19/00; C05B 17/00; C05D 9/02
See application file for complete search history.

(56) References Cited

U.S. PATENT DOCUMENTS

| | | | |
|---|---|---|---|
| 3,244,500 A | 7/1963 | Stinson et al. | |
| 6,322,607 B1 | 11/2001 | Brown et al. | |
| 2011/0302975 A1* | 12/2011 | Antens | C05B 1/00 71/27 |
| 2016/0075607 A1* | 3/2016 | Aqel | C05B 1/02 71/50 |

FOREIGN PATENT DOCUMENTS

WO    1998031648    7/1998

* cited by examiner

*Primary Examiner* — Jennifer A Smith

(57) ABSTRACT

A process for preparing a micronutrient-enriched phosphate-based fertilizer is disclosed. An aqueous fertilizer mixture comprising phosphoric acid and/or phosphate rock is prepared and optionally granulated in granulator unit. The pH of the fertilizer mixture is measured and controlled such that the pH is maintained within a predefined range.

8 Claims, 3 Drawing Sheets

PROCESS FOR PREPARING A FERTILISER

PRIORITY CLAIM

The present application is a National Stage (§ 371) application of PCT/EP2014/064124, filed Jul. 2, 2014, which claims priority from U.S. Provisional Application 61/842,536 filed Jul. 3, 2013, each of which are hereby incorporated by reference in their entirety.

FIELD OF THE INVENTION

The present invention provides a process for the preparation of a micronutrient-enriched phosphate-based fertiliser.

BACKGROUND OF THE INVENTION

Micronutrients including zinc, boron, copper, iron, chlorine, molybdenum and manganese are essential to plant growth but are only required in very small quantities. Micronutrients may be incorporated into fertiliser formulations but there are a number of challenges associated with effective incorporation of the micronutrient. Incorporation of the micronutrient into a bulk fertiliser can lead to a low solubility of the micronutrient such that it is not readily available to plants once applied to the soil. Coating a micronutrient onto a fertiliser can lead to micronutrient loss through abrasion. A bulk blended fertiliser, composed of a small proportion of micronutrient pellets or granules blended within one or more fertilisers, can lead to poor spatial distribution of micronutrient, giving an uneven application of micronutrient to the soil.

U.S. Pat. No. 6,322,607 addresses the problem of providing a zinc-enriched fertiliser that provides relatively efficient zinc uptake in soil or plants. It discloses a process for preparing zinc-enriched ammonium phosphate fertilisers wherein solid ammonium phosphate and a source of zinc such as zinc oxide or zinc sulphate are co-granulated. It is suggested that the process avoids or minimises reaction between the ammonium phosphate matrix and the zinc source and thereby provides a co-granulate wherein the zinc is more readily available for uptake in soil and plants.

The present inventors have sought to provide a process for preparing a micronutrient-enriched phosphate-based fertiliser wherein the micronutrient is readily available to plants.

SUMMARY OF THE INVENTION

Accordingly, the present invention provides a process for preparing a micronutrient-enriched phosphate-based fertiliser comprising steps of:
(a) preparing an aqueous fertiliser mixture comprising phosphoric acid and/or phosphate rock; and
(b) optionally granulating the fertiliser mixture in a granulator unit;
wherein the pH of the fertiliser mixture is measured and controlled in step (a) or in step (b) such that the pH is maintained within a predefined range;
and wherein a source of micronutrient is added in step (a) or step (b).

The present inventors have surprisingly found that by controlling the pH such that it is maintained within a predefined range it is possible to ensure that the micronutrient is present in the fertiliser substantially in a water soluble form. In prior art processes the skilled person has sought to minimise reaction of the micronutrient source and the other fertiliser components, but the present inventors have found that micronutrient solubility can be controlled and even promoted even when the micronutrient is present during the reaction of the fertiliser components. The micronutrient in the resulting fertiliser is present in a form that is substantially available to plants so either the fertiliser can provide a higher concentration of water soluble micronutrient per unit mass of fertiliser for a given micronutrient concentration, or the skilled person can reduce the micronutrient content in the fertiliser and still provide an effective amount of micronutrient to plants. The micronutrient is distributed throughout the fertiliser, and there is no micronutrient loss through abrasion.

DETAILED DESCRIPTION OF THE INVENTION

Figure 1:
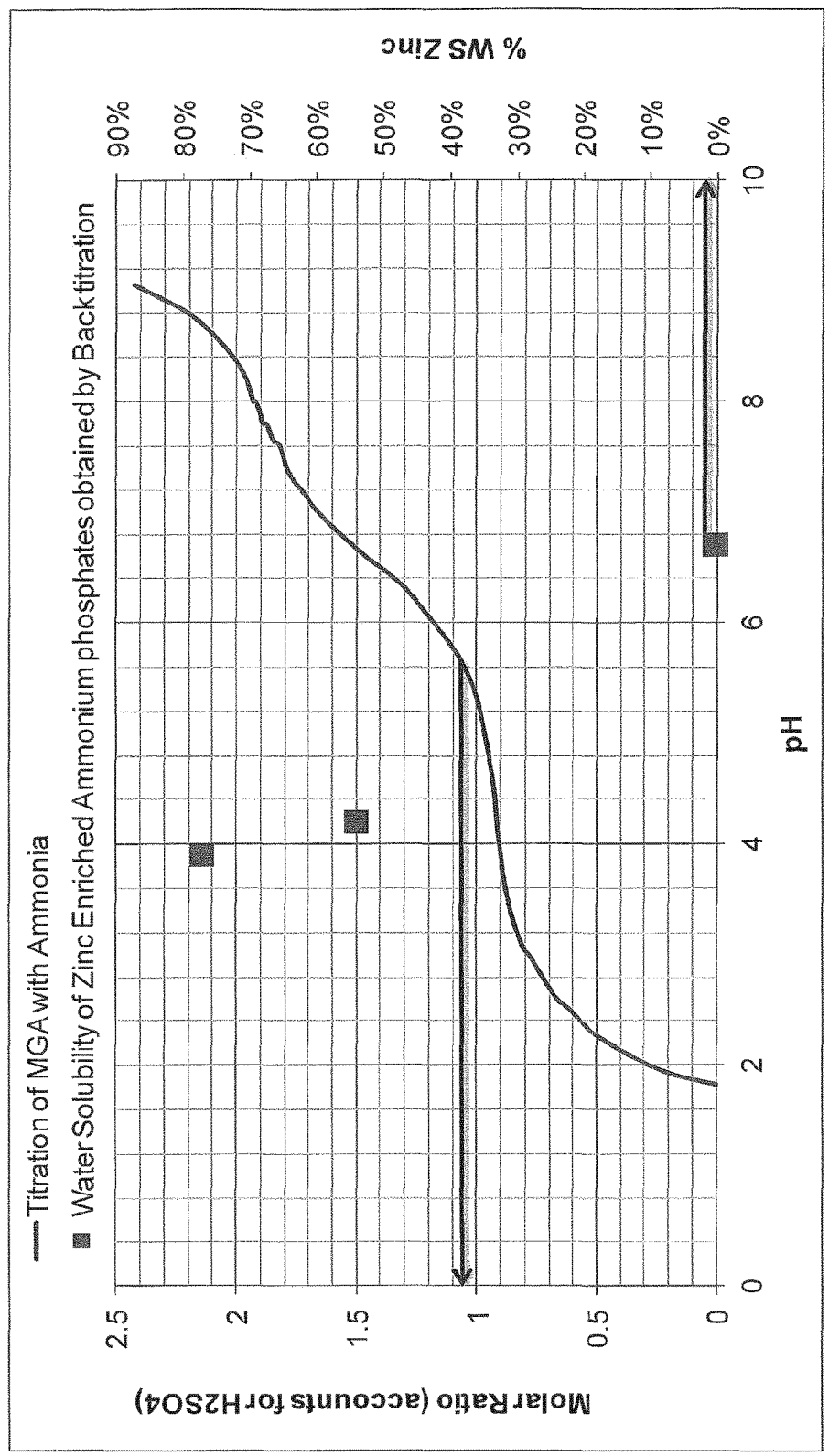
FIG. 1 shows a titration curve for ammonia and phosphoric acid and water solubility values for zinc in zinc-enriched monoammonium phosphate.

The process of the invention comprises a step of preparing an aqueous fertiliser mixture comprising phosphoric acid and/or phosphate rock. In a preferred embodiment of the invention the phosphate-based fertiliser is an ammonium phosphate fertiliser (e.g. monoammonium phosphate or diammonium phosphate) and step (a) is a step of preparing an aqueous fertiliser mixture comprising phosphoric acid and ammonia. In another embodiment of the invention, the phosphate-based fertiliser is triple super phosphate and step (a) is a step of preparing an aqueous fertiliser mixture comprising phosphoric acid and phosphate rock. In yet another embodiment of the invention, the phosphate-based fertiliser is a single super phosphate and step (a) is a step of preparing an aqueous fertiliser mixture comprising phosphate rock and sulphuric acid.

When the phosphate-based fertiliser is an ammonium phosphate-based fertiliser the amounts of ammonia and phosphoric acid are chosen to provide the preferred fertiliser formulation, but may also be varied as one means of controlling the pH. The N:P molar ratio, which refers to the number of moles of ammonia per mole of phosphoric acid, is suitably in the range of from 0.9 to 1 to ensure that the phosphoric acid is slightly underammoniated.

The phosphoric acid preferably has a strength of from 5 to 60 wt % $P_2O_5$, more preferably from 10 to 50 wt % $P_2O_5$. Ammonia is preferably supplied as anhydrous ammonia.

The fertiliser mixture is aqueous. Water may be added to the fertiliser mixture or there may be sufficient water within the other components (e.g. phosphoric acid).

In a preferred embodiment, the fertiliser mixture further comprises elemental sulphur. The elemental sulphur may be added as a slurry of elemental sulphur particles, or as molten sulphur. The amount of elemental sulphur is preferably in the range of from 1 to 12 wt % wherein the weight percentage is the weight of the elemental sulphur divided by the total weight of the fertiliser product.

The fertiliser mixture may further comprise sulphuric acid. The amount of sulphuric acid is preferably in the range of from 1 to 5 wt % wherein the weight percentage is the weight of the sulphuric acid divided by the total weight of the fertiliser product. The amount of sulphuric acid may be varied as one means of controlling the pH.

Step (a) is preferably carried out in a pre-neutraliser, a pipe cross reactor, a pug mill or a comb mixer. The reaction of the fertiliser components is typically exothermic and results in vigorous mixing such that no further agitation is required. Residence time in a pipe cross reactor is preferably just a few seconds, e.g. 1-5 seconds. Residence time in a pre-neutraliser is likely to be longer, e.g. from 30 to 60 minutes.

The product of step (a) is an aqueous slurry. In a preferred embodiment of the process of the invention, the process comprises a step of (b) granulating the product of step (a) in a granulator unit.

The term "granulator unit" is used to describe a device for forming granules of fertiliser product. Commonly used granulators are described in Perry's Chemical Engineers' Handbook, chapter 20 (1997). Preferred granulators are drum granulators or pan granulators. Preferably, the mixture is pumped and distributed on a rolling bed of material in a drum granulator. Optionally, water and steam can be fed to the granulator to control the temperature of the granulation process as needed. Optionally, recycled fertiliser particles may be added to the granulator unit. Recycled fertiliser particles add granulation and nucleating agents. They are obtained from the final fertiliser product. Suitably they have small particle sizes (so-called off-spec fines).

The granulated fertiliser is preferably dried in a drying unit. In a preferred embodiment, the fertiliser is air-dried in the drying unit, thereby avoiding the need for additional drying equipment. Alternatively, drying units wherein heat transfer for drying is accomplished by direct contact between the wet solid and hot gases are used, thereby enabling a faster drying step. Typically, the drying unit is a rotary dryer.

Preferably the fertiliser granules are sorted on their size in a sorting unit to achieve a more uniform size distribution. Typically, oversized granules are crushed and returned to the sorting unit while undersized granules are returned to the granulator as so-called off-spec fines. A preferred size range for the fertiliser granules is from 1.5 to 5.0 mm, more preferably from 2 to 4 mm, expressed as the mean average diameter of the granules. The use of granules which fall within this range is more likely to enable a more even distribution of the fertiliser ingredients in the soil after applying the granules to the soil.

A source of micronutrient is added in step (a) or step (b). The source of micronutrient may be added as a separate component or may be added as one component in a mix of different components.

In a preferred embodiment of the invention, the micronutrient is zinc. If the micronutrient is zinc, the source of micronutrient is preferably zinc oxide or zinc sulphate. Surprisingly the inventors have found that the solubility of the zinc in the fertiliser product is not determined by the solubility of the zinc in the zinc source; insoluble and soluble zinc compounds are equally suitable for use as the zinc source. The inventors have found that zinc sulphate can be easily replaced by the denser and less expensive zinc oxide and still yield a fertiliser with the same water solubility as can be obtained with zinc sulphate.

In an alternative embodiment of the invention, the micronutrient is copper or boron. Suitable sources of copper comprise copper oxide and copper sulphate. Suitable sources of boron comprise boric acid, sodium borate and calcium borate.

The amount of micronutrient is preferably in the range of from 0.05 to 5 wt % wherein the weight percentage is the weight of the elemental micronutrient divided by the total weight of the fertiliser product. When the micronutrient is zinc, the preferred amount of zinc is preferably in the range of from 0.5 to 2 wt %.

The pH of the fertiliser mixture is measured and controlled in step (a) or in step (b) such that the pH is maintained within a predefined range. Preferably the pH of the granulated product from step (b) is measured. Measurement of the pH of the granulated product is suitably carried out using standard methods of pH measurement for solid fertilisers as described in European Standard EN 13037. Essentially the granulated product is dispersed in water (the granulated product is ground in a mill if necessary) and the pH of the resulting suspension is measured using a pH meter. Alternatively, the pH may be measured inline, typically in step (a). Measurement of pH in step (a) could be carried out using a pH meter.

The pH may be controlled by varying the amounts of acid and basic reactants in step (a) and/or step (b). These reactants may be the compounds that will form the fertiliser (e.g. phosphoric acid, ammonia, sulphuric acid) and/or may be supplemental acids and bases added solely to control the pH.

The predefined pH range is chosen according to the micronutrient that is to be incorporated. The skilled person can determine the predefined pH range by carrying out a titration of the fertiliser components and the micronutrient, e.g. for an ammonium phosphate fertiliser by carrying out a titration of phosphoric acid, ammonium and micronutrient. In such a titration ammonia is gradually added to a mixture of phosphoric acid and the micronutrient. Samples are taken at a variety of pH values, and the solubility of the micronutrient is measured. Solubility can be measured by different methods, including those described in the EUROPEAN REGULATION (EC) No 2003/2003 (EC Fertilizers) or those described by the Association of Fertilizer and Phosphate Chemists (AFPC).

When the micronutrient is zinc, the predefined pH range is preferably between 3 and 4.5, preferably between 3.5 and 4, most preferably between 3.5 and 3.9. If the pH is too low then granulation becomes difficult. If the pH is too high then the solubility of zinc in the fertiliser is reduced. By controlling the pH within the predefined pH range the skilled person ensures that the zinc in the resulting fertiliser is substantially available to plants.

It is possible to incorporate potassium into the fertilisers of the invention. This can be achieved by adding a potassium salt to the granulator unit in step (b).

The following non-limiting Examples are illustrative of the invention.

Experiment 1

A zinc-enriched ammonium phosphate was produced to study the influence of pH and molar ratio on zinc solubility.

A 2.1 g commercial merchant grade phosphoric acid (MGA—JR Simplot; 52.1% $P_2O_5$ and 1.78% $H_2SO_4$) was diluted in 20 ml of deionised water in a beaker and titrated with a solution of ammonia having a concentration of 0.85 mol·l$^{-1}$. The pH of the reaction vessel was recorded with time as more ammonia was added to obtain a titration curve for the system.

In parallel, a zinc-enriched ammonium phosphate fertiliser was prepared to study the influence of the pH of the ammonium phosphate fertiliser on the solubility of the zinc contained in the fertiliser. In a two liter beaker, 501 g commercial merchant grade phosphoric acid (JR Simplot; 52.1% $P_2O_5$ and 1.78% $H_2SO_4$) was diluted in 503 g of deionised water. 10.1 g of commercial zinc oxide powder was added and the beaker was placed in a fumehood and its contents stirred with an overhead stirrer. Ammonia gas was bubbled into the reaction mixture while stirring until a N:P molar ratio above one was reached; the pH was 6.7. A sample of the fertiliser was collected and analysed for total and water soluble zinc using preparation methods and analytical tools according to "REGULATION (EC) No 2003/2003 OF THE EUROPEAN PARLIAMENT AND OF THE COUNCIL". The fertiliser was then back titrated to produce a zinc-enriched monoammonium phosphate having a molar ratio of approximately one. Samples of the slurry were taken at a pH of 4.2 and 3.9. Those samples were also analysed for total and water soluble zinc.

A visual representation of the two tests performed is given in FIG. 1. The curve is the titration curve for phosphoric acid and ammonia and should be read with respect to the left-hand axis (showing molar ratio of N:P). The squares are water solubility values for zinc at three different pH values and should be read with respect to the right-hand axis (showing water solubility percentages).

From FIG. 1, one can see that at a pH of 6.7, a N:P molar ratio of approximately 1.6 is reached, and that at this molar ratio, the water soluble portion of the zinc from the insoluble zinc oxide present in the fertiliser is almost zero. However, when the pH is decreased to pH 4.2, and further to pH 3.9, reaching N:P molar ratios of approximately 0.9, the water soluble portion of the zinc from the insoluble zinc oxide present in the fertiliser is greatly improved to above 50%, and further to above 75%, showing that an acute control of pH and N/P molar ratio can enable control of the solubility of zinc, even when insoluble zinc oxide is used as zinc source.

Experiment 2

A zinc and ammonium sulphate-enriched ammonium phosphate was produced to study the influence of pH and molar ratio on zinc solubility.

2.31 g commercial merchant grade phosphoric acid (JR Simplot; 52.1% $P_2O_5$ and 1.78% $H_2SO_4$) and 0.39 g of sulphuric acid (93%) were diluted in 20 ml of deionised water in a beaker and titrated with a solution of ammonia having a concentration of 0.85 mol·l$^{-1}$. The pH of the reaction vessel was recorded with time as more ammonia was added to obtain a titration curve for the system.

In parallel, a zinc and ammonium sulphate enriched ammonium phosphate fertiliser was prepared to study the influence of the pH of the ammonium phosphate fertiliser on the solubility of the zinc contained in the fertiliser. In a two liter beaker, 542 g commercial merchant grade phosphoric acid (JR Simplot; 52.1% $P_2O_5$ and 1.78% $H_2SO_4$) and 95 g of sulphuric acid (93%) was diluted in 512 g of deionised water. 31 g of commercial granular zinc sulphate hexahydrate was added and the beaker was placed in a fumehood and its contents stirred with an overhead stirrer. Ammonia gas was bubbled into the reaction mixture and a forward titration method was followed whereby samples were taken as ammonia was added to the mixtures, their pH recorded, and the total and water soluble zinc were measured. When the reaction mixture had reached a N:P molar ratio of above approximately 1.5 and pH of 6.9, phosphoric acid was added while stirring until a N:P molar ratio of approximately one was reached again, simulating a backward titration. Samples were also taken while simulating the backward titration and measurements of total and water soluble zinc were made.

Figure 2:
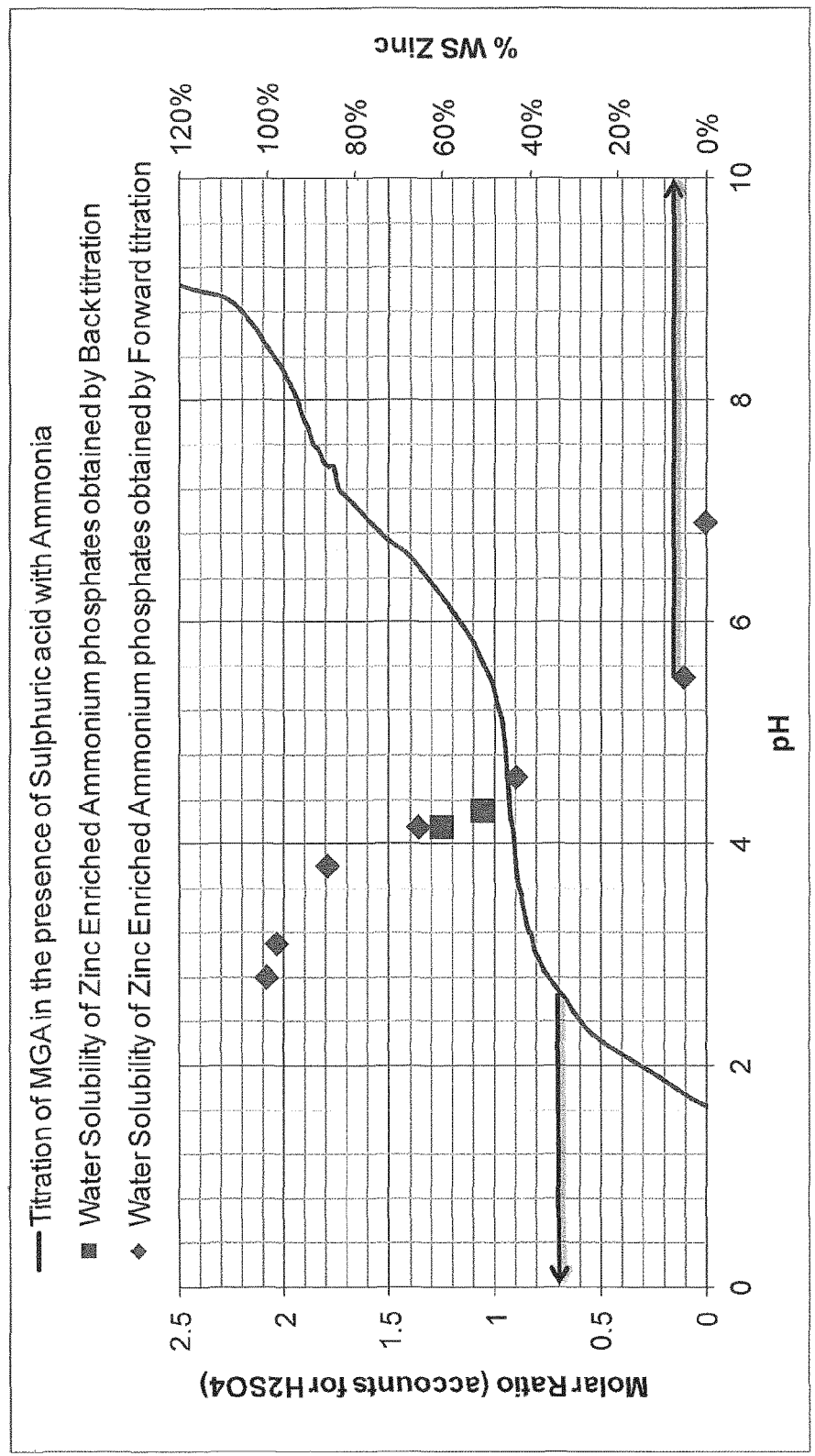
FIG. 2 shows a titration curve for ammonia, phosphoric acid and sulphuric acid, and water solubility values for zinc in zinc-enriched monoammonium phosphate.

A visual representation of the two tests performed is given in FIG. 2. The curve is the titration curve for phosphoric acid, sulphuric acid and ammonia and should be read with respect to the left-hand axis (showing molar ratio of N:P). The squares are water solubility values for zinc at different pH values, wherein the samples were taken during the back titration, and should be read with respect to the right-hand axis (showing water solubility percentages). The diamonds are water solubility values for zinc at different pH values, wherein the samples were taken during the forward titration, and should also be read with respect to the right-hand axis (showing water solubility percentages).

From FIG. 2 one can see that a great amount of variability of zinc solubility is present in ammonium phosphates slurries in a pH range of three to 6 and around a molar ratio of one. It is further observed that the presence of ammonium sulphate does not influence the pH versus zinc solubility relationship, and that the use of soluble zinc sulphate as a zinc source does not prevent zinc desolubilisation at high pH. Last, demonstration is made that the solubilisation/desolubilisation of zinc in ammonium phosphates is a reversible mechanism, driven by pH and molar ratio.

Experiment 3

Pilot plant demonstration of the invention was performed in a one metric ton per hour granulation plant operated at a target 300 kg per hour production rate.

For this experiment, zinc, elemental sulphur and ammonium phosphate-enriched monoammonium phosphate was prepared using a pipe cross reactor targeting a fertiliser grade of 12-40-0-10S-1Zn.

The reaction product was granulated in a rotary granulator in the presence of microgranular zinc sulphate hexahydrate which was fed with the dry recycle. Granulation was controlled by addition of water and steam as required and the so produced granules were dried in a rotary dryer, sieved, the product size granules were collected and the crushed oversize granules were recycled to the granulator, together with the undersize granules, in a typical granulation plant arrangement.

In order to study the influence of pH and Molar ratio on the solubility of zinc in the fertiliser produced, the operator of the granulator was asked to produce a grade having a N/P molar ratio slightly below one (target=0.98), one at a molar ratio of one, and one grade having a molar ratio slightly above one (target 1.02).

The chemical analyses of the products obtained at the three target molar ratios are shown in Table 1:

TABLE 1

| | Target Molar Ratio | | |
|---|---|---|---|
| | 1.02 | 1.00 | 0.98 |
| pH fertiliser | 4.49 | 4.02 | 3.78 |
| $P_2O_5$ (total) | 40.1% | 42.7% | 42.1% |
| N | 11.9% | 11.8% | 11.5% |
| S | 10.1% | 9.8% | 10.3% |
| Zn (total) | 1.14% | 1.10% | 1.05% |
| Zn (water soluble) | 0.6% | 0.97% | 0.99% |
| % water soluble Zn | 53% | 88% | 94% |

It was successfully shown that the solubility of zinc incorporated in a ammonium phosphate fertilizer can be greatly improved by controlling the molar ratio and pH. Further, comparing these results with those of experiments 1 and 2 show that the addition point of the zinc source (solid granules to granulator compared to pre mixing with the acids) does not greatly influence the solubility of the final product.

Experiment 4

Pilot plant demonstration of the invention was further performed to confirm pH as the main influencing variable for the control of water solubility.

Figure 3:
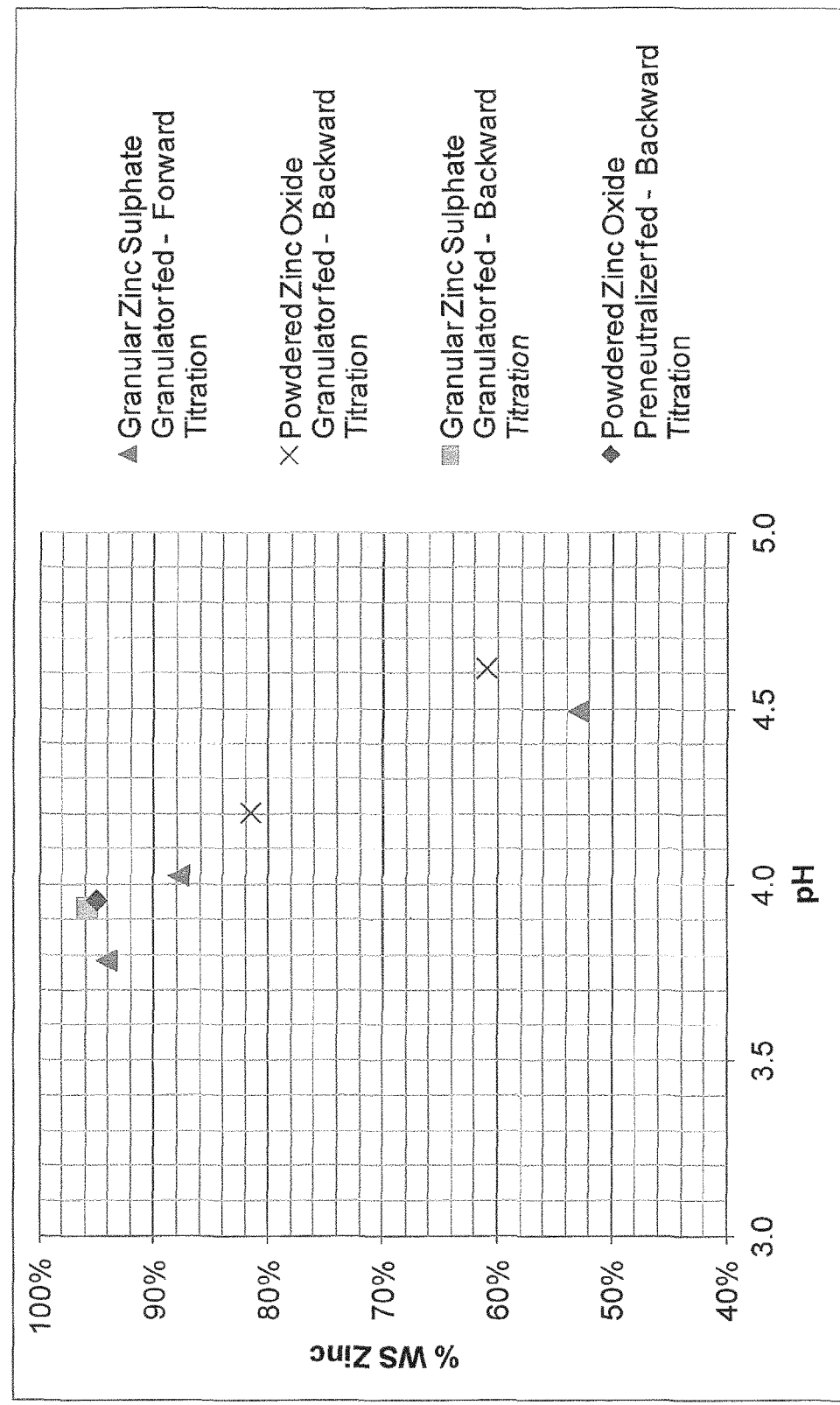
FIG. 3 shows the relationship between pH and water solubility of zinc in zinc-enriched monoammonium phosphate fertilisers.

In the same granulation plant as in Experiment 3, different zinc-enriched fertilizers were prepared changing the zinc source and addition point. Samples were collected, analysed for pH and zinc water solubility and the relationship between pH and water solubility is shown in FIG. 3. The triangles show values for granular zinc sulphate, fed to the granulator in a forward titration. The crosses show values for powdered zinc oxide, fed to the granulator in a backward titration. The squares show values for granular zinc sulphate, fed to the granulator in a backward titration. The diamonds show values for powdered zinc oxide, fed to the preneutraliser in a backward titration.

The graph shows that reducing the pH tends to increase the water solubility.

That which is claimed is:

1. A process for preparing a zinc-enriched phosphate-based fertilizer comprising steps of:
   mixing phosphoric acid, having a strength in the range of from 5 to 60 wt % $P_2O_5$, ammonia, zinc oxide, and elemental sulfur to yield an aqueous fertilizer mixture having a pH;
   controlling the pH of the aqueous fertilizer mixture within a predefined range of from 3.5 to 4.0;
   granulating the aqueous fertilizer mixture in a granulator unit to yield fertilizer granules; and
   drying the fertilizer granules; and
   wherein a water-soluble portion of zinc from the zinc oxide is at least 50% present in the aqueous fertilizer mixture when the ammonia:phosphoric acid (N:P) molar ratio of the aqueous fertilizer mixture ranges from about 0.90 to about 1.00.

2. A process according to claim 1, wherein the phosphate-based fertilizer is an ammonium phosphate fertilizer.

3. A process as recited in claim 1, wherein the amount of elemental sulfur mixed in the aqueous fertilizer mixture is in the range of from 1 to 12 wt %, based on the total weight of aqueous fertilizer mixture.

4. A process as recited in claim 1, wherein the amount of zinc oxide mixed in the aqueous fertilizer mixture is in the range of from 0.05 to 5 wt %, based on the total weight of the aqueous fertilizer mixture.

5. A process as recited in claim 1, further comprising: sorting the dried fertilizer granules to yield oversized granules, undersized granules and dried fertilizer granules having a mean average diameter in the range of from 1.5 to 5.0 mm.

6. A process as recited in claim 1, wherein the amount of zinc oxide mixed in the aqueous fertilizer mixture is in the range of from 0.5 to 2 wt %, based on the total weight of aqueous fertilizer mixture.

7. A process as recited in claim 1, wherein the controlling step includes varying amounts of phosphoric acid and ammonia in the aqueous fertilizer mixture to provide for the predefined range of the pH of the aqueous fertilizer.

8. A process as recited in claim 7, wherein the pH is further controlled by the controlling step by adding an amount of sulfuric acid in the range of from 1 to 5 wt %, based on the total weight of the aqueous fertilizer mixture.

* * * * *